United States Patent
Kuehn

(10) Patent No.: US 9,834,468 B2
(45) Date of Patent: Dec. 5, 2017

(54) OPTICAL COMPONENT MADE OF QUARTZ GLASS FOR USE IN ARF EXCIMER LASER LITHOGRAPHY AND METHOD FOR PRODUCING THE COMPONENT

(71) Applicant: Heraeus Quarzglas GmbH & Co. KG, Hanau (DE)

(72) Inventor: Bodo Kuehn, Gelnhausen (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 14/769,382

(22) PCT Filed: Feb. 19, 2014

(86) PCT No.: PCT/EP2014/053199
§ 371 (c)(1),
(2) Date: Aug. 20, 2015

(87) PCT Pub. No.: WO2014/128148
PCT Pub. Date: Aug. 28, 2014

(65) Prior Publication Data
US 2016/0002092 A1    Jan. 7, 2016

(30) Foreign Application Priority Data
Feb. 20, 2013    (DE) .................. 10 2013 101 687

(51) Int. Cl.
*F21V 9/00*    (2015.01)
*G02B 5/02*    (2006.01)
(Continued)

(52) U.S. Cl.
CPC ............ *C03C 3/06* (2013.01); *C03B 19/1453* (2013.01); *C03B 32/00* (2013.01); *C03B 32/02* (2013.01);
(Continued)

(58) Field of Classification Search
CPC ......... C03C 3/06; C03C 4/04; C03C 2204/00; C03B 19/1453; C03B 32/02;
(Continued)

(56) References Cited

U.S. PATENT DOCUMENTS

2010/0162759 A1    7/2010    Duran et al.

FOREIGN PATENT DOCUMENTS

DE    WO 2009/106134 A1 *    9/2009
DE    112008003728 T5    3/2011
(Continued)

OTHER PUBLICATIONS

International Search Report dated Sep. 25, 2014 in PCT/EP2014/053199.
(Continued)

*Primary Examiner* — Bijan Ahvazi
(74) *Attorney, Agent, or Firm* — Panitch Schwarze Belisario & Nadel LLP

(57) ABSTRACT

An optical component made of synthetic quartz glass includes a glass structure substantially free of oxygen defect sites and having a hydrogen content of $0.1 \times 10^{16}$ to $1.0 \times 10^{18}$ molecules/cm$^3$, an SiH group content of less than $2 \times 10^{17}$ molecules/cm$^3$, a hydroxyl group content of 0.1 to 100 wt. ppm, and an Active temperature of less than 1070° C. The optical component undergoes a laser-induced change in the refractive index in response to irradiation by a radiation with a wavelength of 193 nm using $5 \times 10^9$ pulses with a pulse width of 125 ns and a respective energy density of 500 µJ/cm$^2$ at a pulse repetition frequency of 2000 Hz. The change totals a first measured value $M_{193\,nm}$ when measured using the applied wavelength of 193 nm and a second measured value $M_{633\,nm}$ when measured using a measured wavelength of 633 nm. The ratio $M_{193\,nm}/M_{633\,nm}$ is less than 1.7.

4 Claims, 2 Drawing Sheets

(51) Int. Cl.
*G02C 7/10* (2006.01)
*G02F 1/361* (2006.01)
*G03B 11/00* (2006.01)
*C03C 3/06* (2006.01)
*C03B 19/14* (2006.01)
*C03B 32/00* (2006.01)
*G02B 1/00* (2006.01)
*G02B 1/02* (2006.01)
*C03B 32/02* (2006.01)
*C03C 4/04* (2006.01)
*C03C 15/00* (2006.01)

(52) U.S. Cl.
CPC ............... *C03C 4/04* (2013.01); *G02B 1/00* (2013.01); *G02B 1/02* (2013.01); *C03B 2201/07* (2013.01); *C03B 2201/075* (2013.01); *C03B 2201/21* (2013.01); *C03B 2201/23* (2013.01); *C03B 2201/24* (2013.01); *C03C 2201/11* (2013.01); *C03C 2201/12* (2013.01); *C03C 2201/21* (2013.01); *C03C 2201/23* (2013.01); *C03C 2201/24* (2013.01); *C03C 2203/54* (2013.01); *C03C 2204/00* (2013.01); *Y02P 40/57* (2015.11)

(58) Field of Classification Search
CPC ............ C03B 2201/21; C03B 2201/23; C03B 2201/075; G02B 1/00
USPC .......................................... 252/582; 65/30.1
See application file for complete search history.

(56) References Cited

FOREIGN PATENT DOCUMENTS

EP      1327612 A1    7/2003
WO   2009106134 A1   9/2009

OTHER PUBLICATIONS

International Preliminary Report on Patentability dated Sep. 3, 2015 in International Application No. PCT/EP2014/053199.

* cited by examiner

OPTICAL COMPONENT MADE OF QUARTZ GLASS FOR USE IN ARF EXCIMER LASER LITHOGRAPHY AND METHOD FOR PRODUCING THE COMPONENT

CROSS-REFERENCE TO RELATED APPLICATIONS

This application is a Section 371 of International Application No. PCT/EP2014/053199, filed Feb. 19, 2014, which was published in the German language on Aug. 28, 2014, under International Publication No. WO 2014/128148 A3 and the disclosure of which is incorporated herein by reference.

BACKGROUND OF THE INVENTION

Optical components made of synthetic quartz glass and a method for producing the same are known from WO 2009/106134 A1. The optical component has a glass structure which is substantially free from chlorine, oxygen defect sites and SiH groups (below the detection limit of $5 \times 10^{16}$ molecules/cm$^3$). Within a diameter of 280 mm (CA area), the component exhibits a mean hydrogen content of about $3 \times 10^{16}$ molecules/cm$^3$ and a hydroxyl group content of 25 wt. ppm.

For the production of the component, a $SiO_2$ soot body is dried such that a mean hydroxyl group content of less than 60 wt. ppm is obtained in the quartz glass produced therefrom. Prior to vitrification, the soot body is subjected to a conditioning treatment including a treatment with nitrogen oxide. For reducing mechanical stresses, the quartz glass blank is subjected to an annealing temperature and is finally loaded with hydrogen in an atmosphere of 80 vol.-% nitrogen and 20 vol.-% hydrogen at 400° C. at an absolute pressure of 1 bar for a duration of 80 hours.

Due to the manufacturing process, the synthetic quartz glass produced in this way contains nitrogen, which is chemically bound in the glass network. It shows an advantageous damage behavior vis-à-vis shortwave UV laser radiation especially with respect to the so-called "compaction".

With the damage behavior of the "compaction", a local increase in density is observed in the volume penetrated by radiation during or after high-energy UV laser irradiation of the glass. This causes a local increase in the refractive index which is progressing during continuous irradiation and thereby leads to an increasing deterioration of the imaging properties of the optical component and, in the end, to a premature failure of the component.

For the sake of simplicity, the changes in the refractive index distribution due to compaction are often determined not at the applied wavelength, e.g. at 193 nm, but by using a Fizeau interferometer equipped with a helium-neon laser with a measurement wavelength of 633 nm (more exactly: at a wavelength of 632.8 nm).

It has now been found that, despite identical or similar measured values of their compaction at a measurement wavelength of 633 nm, quartz glasses can surprisingly show different damage behaviors at a measurement wavelength at 193 nm. This particularly poses problems whenever the quartz glass to be measured hints at a quite acceptable compaction behavior at a measurement wavelength of 633 nm, but, upon use with the applied wavelength, unexpectedly shows much poorer values or is even unusable.

BRIEF SUMMARY OF THE INVENTION

It is an objective of the present invention to provide an optical component for use in ArF excimer laser lithography with an applied wavelength of 193 nm, wherein the component, starting from a measurement of the compaction behavior at a measurement wavelength of 633 nm, permits a reliable prediction of the compaction behavior during use with UV laser radiation of the applied wavelength.

Furthermore, it is an objective of the present invention to provide a method which is suited for producing such an optical component.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
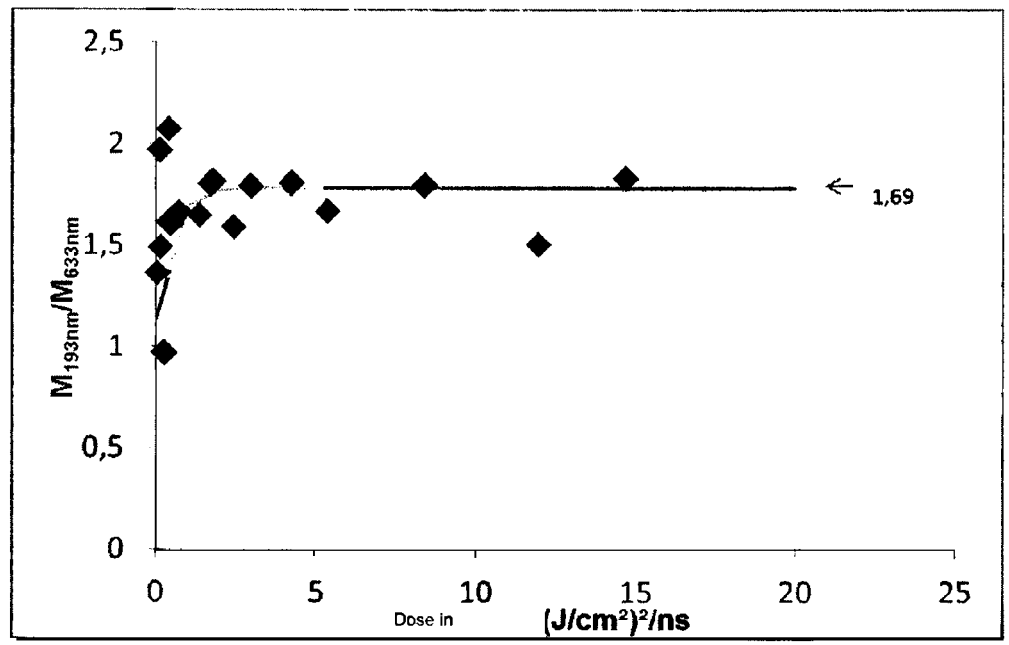
FIG. 1 shows a diagram in which the ratio of measured values (namely the maximum refractive-index increase) of a damage by compaction is plotted against the irradiation dose upon measurement with a measurement wavelength of 193 nm and with a measurement wavelength of 633 nm.

An embodiment of the present invention relates to an optical component made of synthetic quartz glass for use in ArF excimer laser lithography with an applied wavelength of 193 nm, with a glass structure substantially without oxygen defect sites, a hydrogen content in the range of $0.1 \times 10^{16}$ molecules/cm$^3$ to $1.0 \times 10^{18}$ molecules/cm$^3$ and a content of SiH groups of less than $2 \times 10^{17}$ molecules/cm$^3$ and with a content of hydroxyl groups in the range between 0.1 and 100 wt. ppm, wherein the glass structure has a fictive temperature of less than 1070° C. Another embodiment of the present invention relates to a method for producing such an optical component.

The glass structure of the optical component according to the present invention preferably reacts to irradiation with radiation of a wavelength of 193 nm with $5 \times 10^9$ pulses with a pulse width of 125 ns and an energy density of 500 μJ/cm$^2$ each time and a pulse repetition frequency of 2000 Hz with a laser-induced refractive-index change, the amount of which upon measurement with the applied wavelength of 193 nm yields a first measured value $M_{193\ nm}$ and upon measurement with a measurement wavelength of 633 nm a second measured value $M_{633\ nm}$, where: $M_{193\ nm}/M_{633\ nm} < 1.7$.

The dose of irradiation with radiation of the applied wavelength is defined by the pulse number of the laser pulses, their pulse width and energy density and the pulse repetition frequency. With this irradiation dose, the component according to the invention exhibits a compaction behavior with the following typical features:

(a) After the above-specified irradiation dose, the respective measured values $M_{193\ nm}$ and $M_{633\ nm}$ of the measurements of the compaction behavior at 193 nm and at 633 nm show a ratio $M_{193\ nm}/M_{633\ nm}$ that is smaller than 1.7. This is a comparatively small ratio $M_{193\ nm}/M_{633\ nm}$. It has been found that the small ratio represents not only a high compaction resistance of the glass, but is also an indispensable condition for the predictability of the compaction itself.

(b) It has been found that in the quartz glass according to the invention, this small ratio of $M_{193\ nm}/M_{633\ nm}$ which satisfies condition (a) remains almost constant, even if the irradiation dose exceeds the above-specified dose. In view of the constant ratio, it is possible to calculate the compaction due to irradiation with the applied wavelength also for every higher radiation dose than the above-specified one in an exact manner or at least with sufficient accuracy, namely on the basis of a measurement at 633 nm.

If the fulfillment of condition (a) is known for sure, it is thus possible due to condition (b) to reliably predict, by measurements at a wavelength of 633 nm, the compaction behavior upon use of the quartz glass with UV laser radiation of 193 nm. The glass structure is substantially free of oxygen defect sites, such that the concentrations of oxygen deficient defects and oxygen excess defects in the glass structure are below the detection limit of the Shelby method.

The Shelby detection method is published in "Reaction of hydrogen with hydroxyl-free vitreous silica" (J. Appl. Phys., Vol. 51, No. 5 (May 1980), pp. 2589-2593). Quantitatively, this results in a number of oxygen deficient defects or oxygen excess defects in the glass structure of not more than about $10^{17}$ per gram quartz glass.

On the basis of this method, the content of SiH groups is also determined, with a calibration being carried out on the basis of the chemical reaction: Si—O—Si+$H_2$→Si—H+ Si—OH. SiH groups and hydrogen are in a mutual thermodynamic equilibrium. The content of SiH groups is less than $2 \times 10^{17}$ molecules/cm$^3$ in the quartz glass of the component according to the invention, and the hydrogen content is in the range of $0.1 \times 10^{16}$ molecules/cm$^3$ to $1.0 \times 10^{18}$ molecules/cm$^3$.

Hence, SiH— groups are formed by reaction with molecular hydrogen with breakdown of the $SiO_2$ network. They are not desired because a so-called E' center and atomic hydrogen may evolve from them upon irradiation with energy-rich UV light. The E' center causes an increased absorption at a wavelength of 210 nm and is also disadvantageously noticed in the neighboring UV wavelength range.

The hydrogen content ($H_2$) content is determined with the help of a Raman measurement, as suggested in "Khotimchenko et al.; Determining the Content of Hydrogen Dissolved in Quartz Glass Using the Methods of Raman Scattering and Mass Spectrometry," Zhurnal Prikladnoi Spektroskopii, Vol. 46, No. 6 (June 1987), pp. 987-991.

The content of hydroxyl groups is in the range between 0.1 and 100 wt. ppm, preferably between 10 and 60 wt. ppm. The hydroxyl group content is obtained from the measurement of the IR absorption according to the method of D. M. Dodd et al. (see, e.g., "Optical Determinations of OH in Fused Silica", (1966), pp. 3911).

With a decreasing hydroxyl group content, the viscosity of quartz glass is increasing. The low hydroxyl group content of less than 100 wt. ppm leads to a more rigid glass structure and improves the behavior toward a local anisotropic density change, particularly in the case of linearly polarized UV radiation. It has also been assumed that the density change upon compaction is accompanied by a rearrangement of hydroxyl groups, this rearrangement mechanism being the more likely and easier, the more hydroxyl groups are available.

The fictive temperature of the glass structure is less than 1070° C., preferably less than 1055° C. Its measurement method, based on a measurement of the Raman scattering intensity at a wave number of about 606 cm$^{-1}$, is described "The UV-induced 210 nm absorption band in fused Silica with different thermal history and stoichiometry," Ch. Pfleiderer et. al., J. Non-Cryst. Solids 159 (1993) 145-143.

The content of fluorine is preferably less than 10 wt. ppm and the content of chlorine is preferably less than 0.1 wt. ppm. Halogens may react with the $SiO_2$ glass network with breakdown and can thereby weaken the network.

It has been found that the predictability of the compaction behavior upon use of the quartz glass with UV laser radiation of 193 nm is more reliable by measurement at a wavelength of 633 nm, as the ratio of first and second measured value is relatively smaller.

Therefore, in a preferred embodiment of the component, upon measurement of the laser-induced refractive index change, the following is applicable to the ratio of the first measured value $M_{193\ nm}$ and the second measured value $M_{633\ nm}$: $M_{193\ nm}/M_{633\ nm} < 1.6$, and more preferably $M_{193\ nm}/M_{633\ nm} < 1.55$.

In one embodiment according to the invention, a method for producing the optical component comprises:

a) producing a porous soot body of $SiO_2$ by flame hydrolysis of a silicon-containing start substance,
b) drying the soot body,
c) treating the soot body in an oxidizing atmosphere containing $N_2O$, with the proviso that a hydroxyl group content is set in the soot body by drying according to method step (b) and by treatment according to method step (c) in such a manner that due to
d) subsequent sintering of the soot body, a semifinished product of quartz glass is obtained that has a mean hydroxyl group content in the range between 0.1 and 100 wt. ppm,
e) shaping the semifinished product into a blank of quartz glass and annealing the blank, such that the blank has a mean fictive temperature of less than 1070° C., and
f) loading the blank with hydrogen by heating in a hydrogen-containing atmosphere at a temperature below 400° C. while producing a mean hydrogen content in the range of $0.1 \times 10^{16}$ molecules/cm$^3$ to $1.0 \times 10^{18}$ molecules/cm$^3$.

The quartz glass for the optical component according to the invention is produced according to the so-called "soot method". A porous body of $SiO_2$ soot (here called "soot body") is obtained as an intermediate product. The porosity of the soot body makes it possible to change the chemical composition, and thus also directly the $SiO_2$ network structure, and to adapt it to special demands. Specifically, the concentrations of hydroxyl groups and halogens can be reduced and set to predetermined values, or components such as oxygen or nitrogen may be added.

Drying of the soot body is carried out by heating below the vitrification temperature either in a halogen-containing atmosphere or, preferably, under vacuum. Drying leads to a reduction of the hydroxyl groups, which are contained in the soot body due to the manufacturing process, to the predetermined value. The reduction is preferably as uniform as possible. Ideally, the subsequent treatment steps no longer have any significant influence on the hydroxyl group content.

A treatment step of the porous body in an oxidizing atmosphere containing $N_2O$ is essential for the compaction behavior of the quartz glass. Dinitrogen monoxide ($N_2O$) decomposes at a high temperature into oxygen and reactive nitrogen atoms and compounds that are able to react with and saturate the defect sites of the quartz-glass network structure, thereby eliminating the defect sites. The glass network is thereby strengthened.

Apart from the oxidative treatment with $N_2O$, after-treatments of the quartz glass blank obtained from the soot body after vitrification make a further substantial contribution to this effect. On the one hand, a mean fictive temperature of less than 1070° C. is set by annealing the blank; on the other hand, the blank is loaded with hydrogen by heating in a hydrogen-containing atmosphere.

Subsequently, the soot body is vitrified under vacuum into a cylindrical quartz-glass blank. Molecular hydrogen which is introduced into the quartz glass in the flame hydrolysis method and which otherwise would further react forming undesired SiH groups in the subsequent hot treatment steps is removed by the vacuum.

After vitrification, a quartz glass blank with a hydroxyl group content ranging between 0.1 and 100 wt. ppm is obtained. The quartz glass blank is substantially free of SiH groups and of hydrogen (i.e., the content of the two components is below the detection limit). To reduce mechanical stresses as well as birefringence and to produce a compaction-resistant glass structure, the quartz glass blank is subjected to an annealing treatment which is carried out such that, measured over the volume, a mean fictive temperature of less than 1070° C., preferably less than 1055° C., is obtained. It has been found that a comparatively dense network structure is thereby produced, which counteracts further (local) compaction by UV radiation.

The defect-healing action of hydrogen is known. Therefore, depending on the application and on the projected service life of an optical component, a certain hydrogen content is often predetermined, even if other disadvantages have to be accepted in return. After annealing, the hydrogen content of the quartz glass is, however, below the resolution limit of the measurement method. The quartz glass is subsequently loaded with hydrogen. Preferably, the loading with hydrogen is carried out at a temperature below 400° C., preferably below 350° C., because in a thermodynamic equilibrium, SiH groups are formed at elevated temperatures in the quartz glass at the presence of hydrogen at elevated temperatures. The particularly low loading temperature prevents or avoids this. Upon irradiation with energy-rich UV light, SiH groups may form so-called E' centers which, in turn, cause an enhanced absorption at a wavelength of 210 nm, which can be disadvantageously noticed also in the neighboring wavelength range of the applied radiation.

A mean hydrogen content in the range of $0.1 \times 10^{16}$ molecules/cm$^3$ to $1.0 \times 10^{18}$ molecules/cm$^3$ is set. Due to the low loading temperature, a high hydrogen partial pressure is instrumental in achieving an adequate hydrogen loading within economically reasonable treatment periods. The hydrogen partial pressure is therefore preferably between 1 and 150 bar.

An increased pressure accelerates not only hydrogen loading, but may also contribute to a somewhat compacter glass structure of increased density that is resistant to local anisotropic density change.

The outcome of the manufacturing method is a cylinder of quartz glass with a specific compaction behavior. After irradiation with the specific radiation dose of the wavelength of 193 nm (with $5 \times 10^9$ pulses with a pulse width of 125 ns and an energy density of 500 µJ/cm$^2$ each time and a pulse width repetition frequency of 2000 Hz), the quartz glass reacts with a maximum value of the laser-induced refractive index change, the amount of which upon measurement with the applied wavelength of 193 nm yields a first measured value $M_{193\ nm}$ and upon measurement with a measurement wavelength of 633 nm yields a second measured value $M_{633\ nm}$, where $M_{193\ nm}/M_{633\ nm} < 1.7$; and preferably, $M_{193\ nm}/M_{633\ nm}$ is less than 1.6, and more preferably $M_{193\ nm}/M_{633\ nm}$ is less than 1.55.

It is important, particularly at a sufficiently small ratio value, that the ratio remains constant upon further irradiation under the same irradiation conditions, which permits a reliable prediction of the damage upon further irradiation with the applied radiation, based on a measurement at 633 nm.

The level of the constant value of the ratio $M_{193\ nm}/M_{633\ nm}$ is particularly strongly influenced by the maximum loading temperature in the hydrogen treatment and by the mean hydrogen concentration produced thereby in the quartz glass. The hydrogen loading temperature can be regarded as a measure of the number of defect sites and SiH groups.

The optical component for use in microlithography for the applied wavelength of 193 nm is obtained from the quartz glass cylinder by standard after-treatment steps, such as cutting, grinding, polishing.

To avoid contact of the $SiO_2$ network with halogen-containing drying reagents, the drying of the soot body according to method step (b) is preferably carried out purely thermally under vacuum or in inert gas, and comprises a treatment of the soot body at a drying temperature in the range between 100° C. and 1350° C., preferably at not more than 1300° C.

An input of halogens into the soot body is avoided by dispensing with halogen-containing drying reagents, so that these do not have to be removed again later. On the other hand, oxygen defects are created due to the long-winded thermal treatment under reducing conditions, because a suitable substituent is not directly available for the removed OH groups. The oxygen defects impair the UV radiation resistance of the quartz glass.

Accordingly, after completion of the drying treatment, the soot body is treated in $N_2O$-containing atmosphere at the same or a lower temperature. Treatment temperatures of less than 600° C., preferably below 500° C., are particularly useful. The $N_2O$ content of the atmosphere is between 0.1 and 10 vol.-%, preferably between 0.5 and 5 vol.-%; the treatment duration is at least 10 h.

At nitrogen oxide contents below 0.1 vol.-%, a small oxidative effect is achieved, and at nitrogen oxide contents of more than 10 vol.-%, the $SiO_2$ network may be overloaded with nitrogen and bubbles may form in the subsequent vitrification. The treatment is carried out at such a low temperature that the porosity of the soot body is maintained. At treatment temperatures of less than 200° C., the reactivity of $N_2O$ is however very low and long treatment periods are needed for achieving a noticeable effect with respect to the saturation of oxygen defects.

Sample Preparation

A soot body is produced by flame hydrolysis of $SiCl_4$ and the OVD method. The soot body is dehydrated under vacuum at a temperature of 1200° C. for 50 hours in a heating furnace having a heating element of graphite. The graphite in the heating furnace produces reducing conditions. If the soot body is immediately vitrified after this treatment stage, quartz glass that includes oxygen defects in the order of $1.7 \times 10^{16}$ cm$^{-3}$ are obtained.

The thermally dried soot body is subsequently heated in an oxidizing atmosphere. The soot body is continuously heated in a treatment chamber with a treatment gas of dinitrogen monoxide ($N_2O$; 1.5 vol.-%) in a carrier gas stream of nitrogen to a temperature of 450° C. and kept at this temperature for 20 hours.

Subsequently, the dried and aftertreated soot body is vitrified in a sintering furnace at a temperature of about 1400° C. under vacuum ($10^{-2}$ mbar) into a transparent quartz glass blank. The blank is subsequently homogenized by thermo-mechanical homogenization (twisting) and formation of a quartz glass cylinder.

After completion of the homogenization treatment, the hydroxyl group content of the soot body is about 25 wt. ppm.

To reduce mechanical stresses as well as birefringence and to produce a compaction-resistant glass structure, the quartz glass cylinder is subjected to an annealing treatment in which the quartz glass cylinder is heated in air and at an atmospheric pressure to 1190° C. for a holding period of 8 hours and is subsequently cooled at a cooling rate of 4° C./hour to a temperature of 1050° C. and is kept at the lower temperature for 4 hours. Thereupon, the quartz glass cylinder is cooled at a higher cooling rate of 50° C./hour to a temperature of 300° C., whereupon the furnace is switched off and the quartz glass cylinder is allowed to cool freely in the furnace.

The quartz glass cylinder treated in this way has an outer diameter of 350 mm and a thickness of 60 mm. Measured over the thickness, a mean fictive temperature of 1065° C. is obtained.

The quartz glass cylinder is subsequently loaded with hydrogen. The two-stage treatment is carried out in an atmosphere of 100 vol.-% hydrogen by heating at a temperature $T_{loading}$ of 380° C., first at a pressure $p1_{loading}$ of 11 bar and for a holding period $t1_{loading}$ of 30 hours, and subsequently at a pressure $p2_{loading}$ of 1 bar and for a holding period $t2_{loading}$ of 80 hours.

The quartz glass cylinder obtained thereafter is substantially free of chlorine oxygen defect sites and SiH groups (below the detection limit of $5 \times 10^{16}$ molecules/cm$^3$), and is distinguished within a diameter of 280 (CA area) by a mean hydrogen content of $40 \times 10^{16}$ molecules/cm$^3$ and a hydroxyl group content of 25 wt. ppm.

Table 1 summarizes the parameters of the individual method steps and the measurement results for the above-described Sample 1 and for further Samples 2 to 7 which are produced in a similar way.

Compaction Measurement

All of the Samples 1-7 were irradiated with radiation of a wavelength of 193 nm, which is characterized by the following dose:
Pulse number: $5 \times 10^9$ pulses;
Pulse width: 125 ns;
Energy density: 500 µJ/cm$^2$ each time; and
Pulse repetition frequency: 2000 Hz.

In the sample irradiated in this way, the amount of the local maximum refractive-index change as compared with the non-irradiated glass is determined, namely both by measurement with a measurement wavelength of 193 nm (amount of the maximum refractive-index change: $M_{193\,nm}$) and by measurement with a measurement wavelength of 633 nm (amount of the maximum refractive-index change: $M_{633\,nm}$). The ratio of the measured values $M_{193\,nm}/M_{633\,nm}$ is indicated in the last row of Table 1.

The measurement results show that the ratio $M_{193\,nm}/M_{633\,nm}$ can be regarded as a quality reference to a small and predictable compaction, and is obviously considerably determined by the parameters in the after-treatment of the soot body in a N$_2$O-containing atmosphere and after-treatment of the vitrified quartz glass blank in an H$_2$-containing atmosphere. Also, the intensity of the N$_2$ treatment for the elimination of oxygen defect sites and the temperature during hydrogen loading play a decisive role in preventing SiH groups.

This is also demonstrated by the further measurement results discussed hereinafter with reference to the diagrams of FIGS. 1 to 3.

Specifically, for Sample 3, FIG. 1 shows the development of the ratio V ($M_{193\,nm}/M_{633\,nm}$) with the irradiation dose ("dose") as a product of the energy density to the square and pulse number divided by the pulse width in time in ns (in the unit (J/cm$^2$)$^2$/ns).

Thus, the ratio $M_{193\,nm}/M_{633\,nm}$ first rises steeply at the irradiation beginning from 1.0 to about 1.69, and remains thereafter (after a pulse number of about 3×108 pulses, or after a dose D of about 3 J/cm$^2$)$^2$/ns) approximately constant at this value (hereinafter also called "final value").

Corresponding tests were carried out for other quartz glass qualities. Samples 1 and 5 showed similar profiles of the ratio $M_{193\,nm}/M_{633\,nm}$ with the irradiation dose. An

TABLE 1

| | Sample | | | | | | |
|---|---|---|---|---|---|---|---|
| | 1 | 2 | 3 | 4 | 5 | 6 | 7 |
| $T_{N2O\,treatment}$ (° C.)/ $t_{N2O\,treatment}$ (hours) | 550/20 | 550/20 | 550/20 | — | 450/20 | — | — |
| $T1_{annealing}$ (° C.)/ $t1_{annealing}$ (hours) | 1190/8 | 1190/8 | 1190/8 | 1190/8 | 1190/8 | 1190/8 | 1190/8 |
| $T2_{annealing}$ (° C.)/ $t2_{annealing}$ (hours) | 1050/4 | 1100/4 | 1050/4 | 1050/4 | 980/4 | 1100/4 | 1070/4 |
| $T_{loading}$ (° C.) | 380° C. | 400° C. | 400 | 425° C. | 380° C. | 425° C. | 450° C. |
| $t1_{loading}$ (hours)/ $p1_{loading}$ (bar) | 30 h @ 11 bar | 50 h @ 100 bar | 30 h @ 5 bar | 30 h @ 5 bar | 30 h @ 11 bar | 15 h @ 50 bar | 6 h @ 11 bar |
| $t2_{loading}$ (hours)/ $p2_{loading}$ (bar) | 80 h @ 1 bar | 70 h @ 25 bar | 70 h @ 0.9 bar | 70 h @ 0.9 bar | 80 h @ 1 bar | 70 h @ 6 bar | 70 h @ 0.6 bar |
| OH (wt. ppm) | 25 | 21 | 22 | 37 | 35 | 38 | 40 |
| Mean value of Tf (° C.) | 1065 | 1102 | 1067 | 1060 | 1054 | 1105 | 1075 |
| Hydrogen cont. ($\times 10^{16}$ molecules/cm$^3$) | 40 | 850 | 30 | 30 | 40 | 200 | 20 |
| SiH content ($\times 10^{16}$ molecules/cm$^3$) | 6 | 212 | 15 | 20 | 4 | 100 | 20 |
| $M_{193\,nm}/M_{633\,nm}$ | 1.55 | 4.70 | 1.69 | 1.75 | 1.53 | 15.27 | 1.75 | initially stronger rise of the ratio $M_{193\,nm}/M_{633\,nm}$ to more than 1.7 was found in the remaining samples and also a less constant profile with an increasing irradiation dose. These are comparative samples (i.e., Samples 2, 4, 6 and 7).

In Samples 1, 3 and 5, due to the substantially constant ratio $M_{193\,nm}/M_{633\,nm}$, the degree of compaction can be reliably indicated by continuous measurements at a wavelength of 633 nm by using the quartz glass with UV laser radiation of 193 nm.

Based on the results of numerous measurements of such a type, it was found that if the quartz glass has been subjected to an adequately oxidative treatment under $N_2O$, the parameters that influence the final value of the ratio can ultimately be summarized in the loading temperature in the case of hydrogen loading ($T_{loading}$ in ° C.) and in the mean hydrogen concentration ($C_{H2}$ in $10^{17}$ molecule/cm$^3$) produced in the quartz glass.

Thus, the temperature during loading of the quartz glass with hydrogen is of relevance to the formation of SiH groups. The lower the temperature, the lower the SiH group concentration evolving in the thermal equilibrium. On the other hand, hydrogen loading is diffusion-controlled, so that low loading temperatures, depending on the diffusion length and an acceptable concentration gradient, require long treatment periods.

The loading process is energy- and time-consuming and, therefore, as short and "cold" as possible, but must be carried out for such a long period as is needed for ensuring a given compaction behavior of the quartz glass. This estimation has so far been an empirical one. However, it has been found that the following equation is suited for estimating the final value for the ratio $M_{193\,nm}/M_{633\,nm}$:

$$M_{193\,nm}/M_{633\,nm} = 1.47 + 0.0345 \times 2^{((T_{loading}-400)/25)} \times C_{H2} \quad (1)$$

Thus, at the moment, the final value has a limit of 1.47 that must be reached. Additional contributions are due to the parameters of the hydrogen loading. Based on the calculation model (1), the final value can thus be estimated for the ratio $M_{193\,nm}/M_{633\,nm}$ and thus the compaction tendency of the quartz glass toward UV radiation of a wavelength of 193 nm, particularly in the case of linearly polarized radiation, and hydrogen loading can thereby be optimized.

Figure 2:
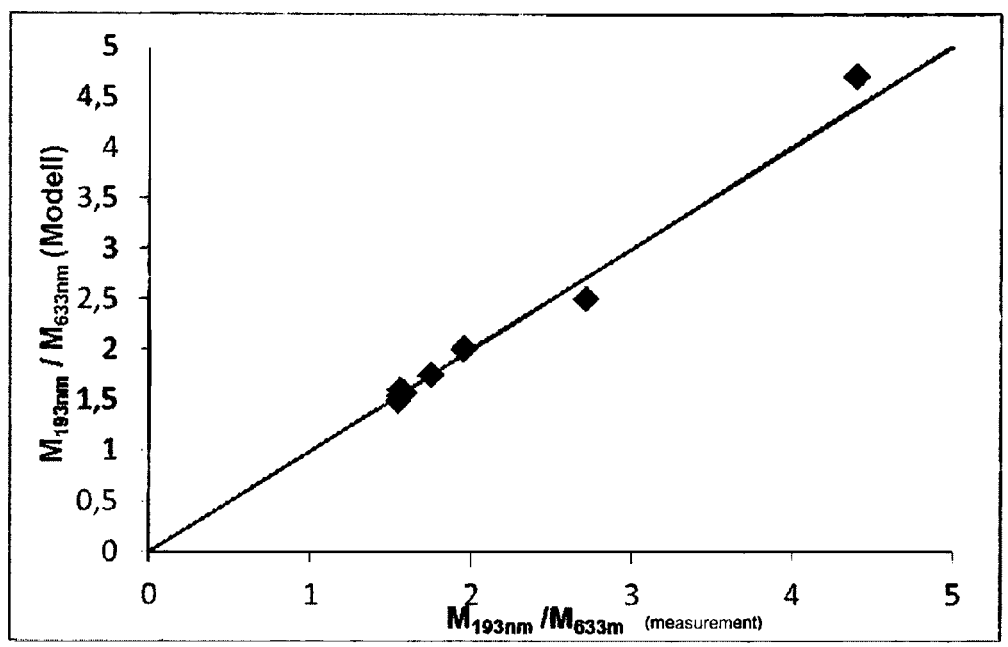
FIG. 2 shows a diagram in which the ratio $M_{193\ nm}/M_{633\ nm}$ determined on the basis of a model calculation is plotted against measured values of the ratio.

The validity of this model assumption is demonstrated by FIG. 2. Referring to FIG. 2, the final value of the ratio $M_{193\,nm}/M_{633\,nm}$, which is determined on the basis of the above-indicated model calculation (1), is plotted for some of the samples of Table 1 against the actually-measured final values after irradiation with the above-specified irradiation dose. The measured values are located almost exactly along a straight line with the slope 1, which can be regarded as proof of the correctness of the model according to equation (1).

Figure 3:
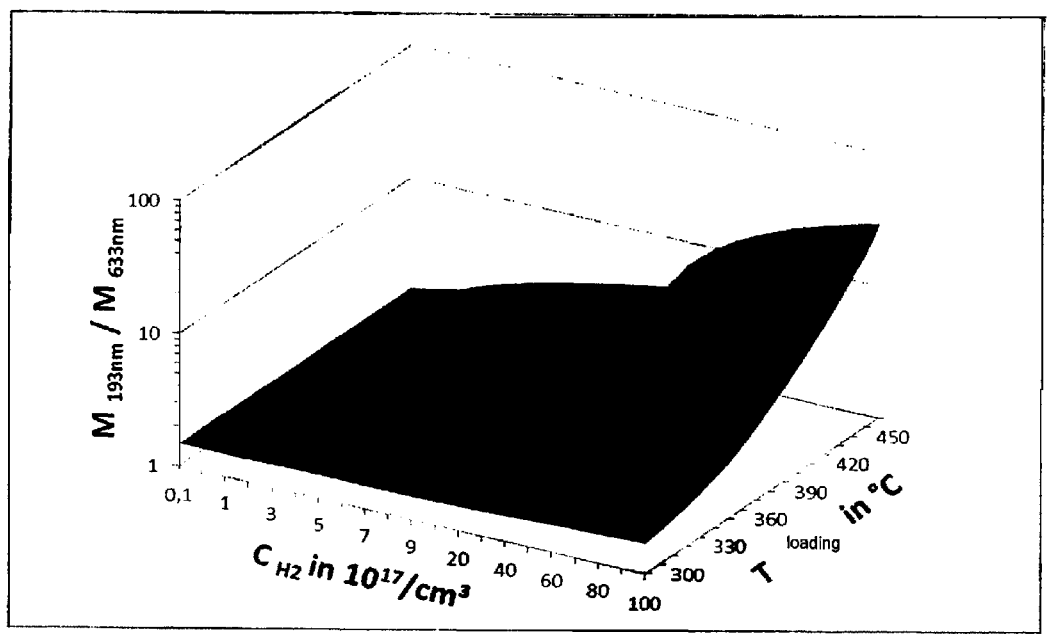
FIG. 3 shows a result of the model calculation which illustrates the dependence of the ratio $M_{193\ nm}/M_{633\ nm}$ on the hydrogen content of the quartz glass and the hydrogen loading temperature in a three-dimensional representation.

The result becomes more comprehensible with a look at the three-dimensional modeling of FIG. 3. Referring to FIG. 3, the final value of the ratio $M_{193\,nm}/M_{633}$ (as a measure of the compaction tendency of the quartz glass) is plotted against the hydrogen content of the quartz glass $C_{H2}$ in $10^{17}$ molecules/cm$^3$ (x-axis) and against the temperature $T_{loading}$ in ° C. with the hydrogen loading (z-axis). The loading temperature $T_{loading}$ is a measure of the SiH concentration at the same time.

Thus, the compaction tendency normally increases strongly with the loading temperature and slightly with the hydrogen concentration. A certain hydrogen concentration is often given. This specification can basically be met at a high loading temperature within a short period of time and at a low loading temperature within a longer period of time. For the former, an increased compaction tendency follows automatically; for the latter, there is an economically more troublesome production process.

If, in addition to the hydrogen concentration, the maximally admissible compaction tendency is also given, the highest, but still acceptable loading temperature can be determined with the help of the model and the loading period can thus be shortened to a minimum.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for producing optical component made of synthetic quartz glass for use in ArF excimer laser lithography with an applied wavelength of 193 nm, the method comprising the following steps:
   a) producing a porous soot body of $SiO_2$ by flame hydrolysis of a silicon-containing starting substance;
   b) drying the porous soot body;
   c) treating the porous soot body in an oxidizing atmosphere containing $N_2O$ at a treatment temperature of less than 500° C. for at least 10 hours, a $N_2O$ content of the atmosphere being between 0.1 and 10 vol.-%;
   d) subsequent sintering of the porous soot body, a hydroxyl group content in the porous soot body being set by drying according to step b) and by treatment according to step c) such that a semi-finished product of quartz glass is obtained, the semi-finished product having a mean hydroxyl group content in the range between 0.1 and 100 wt. ppm;
   e) shaping the semi-finished product into a blank of quartz glass and annealing the blank; and
   f) loading the blank with hydrogen by heating in a hydrogen-containing atmosphere at a temperature below 400° C. so as to produce a glass structure which is substantially free of oxygen defect sites,
   wherein the glass structure has a hydrogen content in the range of $0.1 \times 10^{16}$ molecules/cm$^3$ to $1.0 \times 10^{18}$ molecules/cm$^3$, a content of SiH groups of less than $2 \times 10^{17}$ molecules/cm$^3$, a content of hydroxyl groups in the range between 0.1 and 100 wt. ppm, and a fictive temperature of less than 1070° C.,
   wherein the glass structure reacts to irradiation with radiation of an applied wavelength of 193 nm with $5 \times 10^9$ pulses with a pulse width of 125 ns and an energy density of 500 μJ/cm2 each time and a pulse repetition frequency of 2000 Hz with a laser-induced refractive-index change, the amount of which upon measurement with the applied wavelength of 193 nm yields a first measured value $M_{193\,nm}$ and upon measurement with a measurement wavelength of 633 nm yields a second measured value $M^{633\,nm}$, and wherein $M_{193\,nm}/M_{633\,nm} < 1.7$.

2. The method according to claim 1, wherein the drying of the porous soot body according to step b) includes a treatment of the porous soot body at a drying temperature in the range between 1100° C. and 1350° C.

3. The method according to claim 1, wherein the loading of the blank with hydrogen is carried out at a pressure between 1 and 150 bar.

4. The method according to claim 1, wherein the loading of the blank with hydrogen is carried out at a temperature below 350° C.

* * * * *